May 7, 1963 M. DRODOFSKY 3,088,217
ORIENTATION COMPASS
Filed Oct. 31, 1961 2 Sheets-Sheet 1

INVENTOR:
Martin Drodofsky
BY Singer, Stern &
Carlberg, Attorneys.

May 7, 1963 M. DRODOFSKY 3,088,217
ORIENTATION COMPASS
Filed Oct. 31, 1961 2 Sheets-Sheet 2
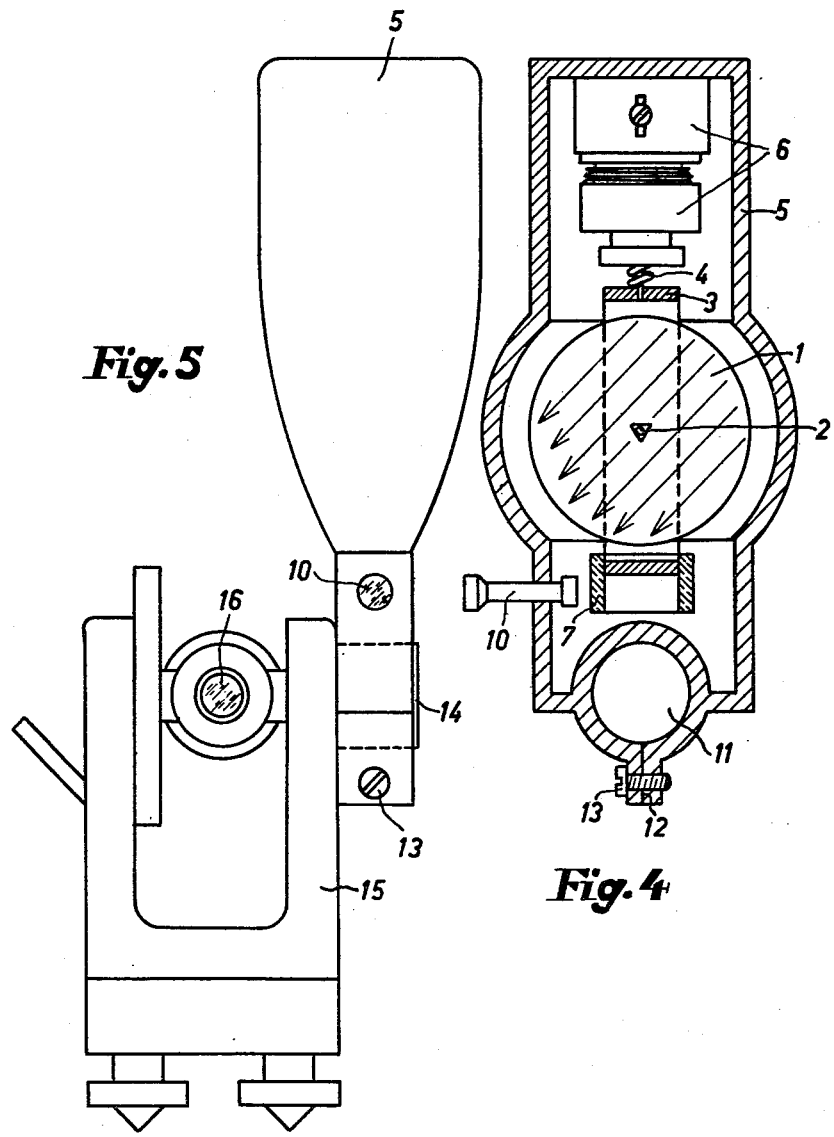
INVENTOR:
Martin Drodofsky,
BY Singer, Stern &
Carlburg, Attorneys.

United States Patent Office 3,088,217
Patented May 7, 1963

3,088,217
ORIENTATION COMPASS
Martin Drodofsky, Heidenheim (Brenz), Germany, assignor to Carl Zeiss, Oberkochen, Wurttemberg, Germany
Filed Oct. 31, 1961, Ser. No. 149,011
Claims priority, application Germany Nov. 10, 1960
8 Claims. (Cl. 33—222)

The invention relates to an orientation compass which is particularly suitable to be employed as a supplementary device for geodetical instruments.

For the orientation of the target line of the telescope of geodetical instruments to the magnetic north or the geographic north, respectively, there have been proposed heretofore a number of compasses of different construction which either are mounted upon the principal instrument, such as a theodolite, a tachymeter or a leveling instrument, or which are rigidly mounted into the same.

All these known compasses have in common a magnetic needle which oscillates in a horizontal plane about a vertical axis of rotation and for this purpose the needle is rotatably supported upon a point. In most circular compasses the magnet needle, which is freely rotatable about 360°, is surrounded by a circular scale which permits the position of the needle to be read off in relation to the principal instrument. The zero point of this circular scale is arranged in most cases in such a manner that the target line of the telescope in the principal instrument points to magnetic north when the magnet needle points to 0° or to 180° of the circular scale.

Since a geodetical instrument in most cases has its own circular scale, it is often sufficient to adjust the zero point of this circular scale on the instrument with the assistance of a compass in such a manner that the target line of the telescope of the instrument points to magnetic north when the instrument indicates the zero position. For this purpose there have been developed so-called box compasses which no longer employ a circular scale and whose magnet needle can perform within its "box" only very limited oscillations. The housing of such a compass is provided with two index lines to which the pole points of the magnetic needle must point when the target line of the telescope of the principal instrument is oriented to the magnetic north. Such an arrangement is easily adjusted with the assistance of a known direction in the terrain so that with a box compass, when it is adjusted to the correct position, the amount of the magnetic misdirection (including any adjusting errors of the compass relative to the telescope of the principal instrument) is determined on the circular scale of the principal instrument and is taken into account in such a manner that at the reading zero on the circular scale of the principal instrument the target line of the telescope points to the geographic north.

Furthermore, so-called tube compasses are known in which a mirror is arranged above the center of the magnetic needle in such a manner that when the target line of the principal instrument is correctly adjusted both ends of the magnetic needle are brought into optical superimposition. In this manner it is no longer necessary to adjust to certain index lines on the housing so that the observation of the correct adjustment of the instrument is substantially facilitated and errors of eccentricity are avoided.

These known arrangements have, however, substantial disadvantages of which the following are a few:

The heretofore customary mounting of the magnetic needle upon a fine point is very sensitive against shocks so that the needle has to be removed from the point by means of additional devices when the compass is not in use. Furthermore, in such mountings the magnetic needle performs certain oscillations which are difficult to damp so that in most cases one has to be satisfied with the inaccurate observation of the reversing points of the needle oscillation because one will not wait until the needle has come to a complete rest.

Another substantial disadvantage of the known compass arrangements is that the magnetic needle always can only be balanced over a relatively small range of the geographic latitude in order to be sufficiently horizontal. In order to accommodate the needle to the magnetic inclination at the instrument station, the needles of the customary compasses are mostly provided with radially displaceable weights which have to be so adjusted that the needle is horizontal.

It is an object of the present invention to overcome and eliminate these disadvantages and difficulties in a particularly novel manner by employing an orientation compass which is especially suitable to be used as a supplement for geodetic instruments and which is provided with a polar magnetized circular disc arranged to pivot azimuthally about a horizontal axis of rotation.

In accordance with the invention this circular magnetized disc consists preferably of a magnetic hard material and is magnetized along a diameter. The orientation of the circular disc is indicated either by mechanical or by optical indicating means. In a preferred embodiment of the invention the position of the circular disc is observed by an autocollimator containing a reticle.

Additional details of the invention will be described in connection with the accompanying drawings which illustrate one particular embodiment of the invention. The FIGS. 1 to 3 illustrate diagrammatically the adjusting system of an orientation compass in accordance with the invention, while the FIGS. 4 and 5 illustrate an orientation compass employed as a supplement in connection with a theodolite, whereby certain parts are omitted in order to disclose the invention in a clear manner.

In the drawings:

FIG. 4 illustrates the adjusting system when built into a housing which is adapted to be flange-connected to the principal instrument, and FIG. 5 shows the orientation compass which carries the adjusting system of the invention when attached to a theodolite.

Figure 1:
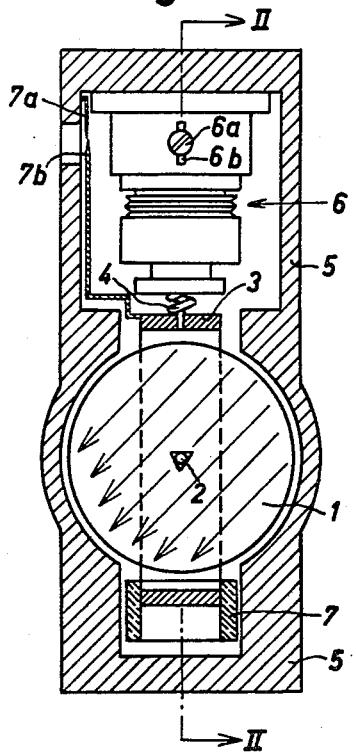
FIG. 1 illustrates diagrammatically a side elevation view of the adjusting system of the invention.

Referring to FIG. 1, a circular magnetic disc 1 is rotatably mounted within a vertically extending narrow frame 3 about a horizontal axis 2. The frame 3 consists of non-magnetizable material and is suspended by means of a helical spring 4 in the upper portion of the compass housing 5 which in turn is constructed to be mounted upon the instrument to be oriented, or it may also be fixedly mounted in the instrument itself. The point of suspension 4a of the spring 4 is preferably arranged to be adjustable in the vertical direction and also in a direction rotatable about a vertical axis for which purpose there are illustrated particularly in FIG. 2 the details of an adjusting device 6. When the screw 6a, guided in a slot 6b of a guide tube 6c, is loosened the support 6g of the frame 3 can be adjusted in a vertical direction and when the clamping nut 6e is loosened said support 6g is capable of rotating about its vertical axis.

The frame 3 has attached to its lower end a mirror 7 which permits an indication of the adjusting movements of the frame 3 and the magnetic disc 1 therein. These adjusting movements of the magnetic disc 1 may also be indicated by mechanical pointers 7a and 7b.

Figure 3:
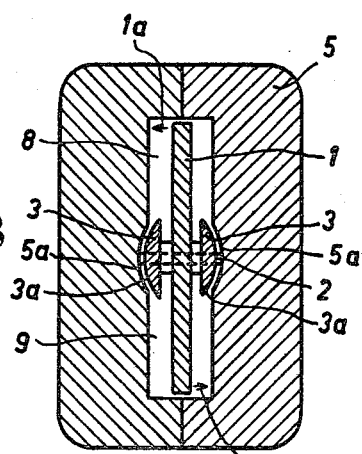
FIG. 3 illustrates diagrammatically a horizontal sectional view along the line III—III of FIG. 2.

In accordance with a preferred embodiment of the invention, the rotative adjustment of the mirror 7 relatively to the housing 5 of the compass is observed by an autocollimator 10 which is rigidly mounted on the housing 5 and has arranged therein a reticle. For the purpose of dampening the rotative movements of the frame 3 with the circular disc 1 therein, the frame 3 is suspended in such a manner in the housing 5 of the compass that there remain only narrow air spaces. The inner walls of the housing 5 are provided, as particularly illustrated in FIG. 3, with concave recesses 5a in which the frame 3 provided with convex outer surfaces 3a is arranged with very little clearance so that upon rotative movements of the disc 1 in the direction of the arrows 1a shown in FIG. 3 a displacement of the air in the chambers 8 and 9 can take place only by means of very narrow air gaps formed between the frame 3 and the disc 1 and the housing 5. The frame 3 has, as shown, an exterior cylindrical shape and is substantially circular in cross section and moves within a central cylindrical chamber of the housing 5. The circular disc 1 is so constructed that in the recess of the housing 5 it has only a few tenths of a millimeter clearance in the direction of its plane (FIG. 3). In this manner any rotative oscillations of the adjusting system in the orientation plane are practically completely eliminated. Any oscillations in the vertical direction and in the rotative direction of the frame 3 do not influence the indication and remain undamped.

Figure 2:
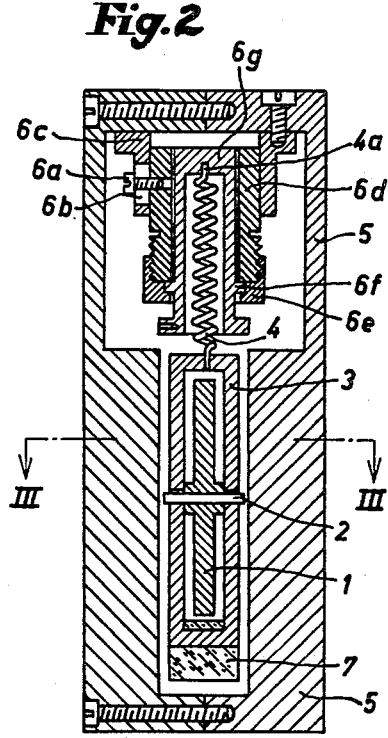
FIG. 2 illustrates diagrammatically a vertical sectional view along the line II—II of FIG. 1.

The magnetic disc 1 has the tendency to adjust itself with its magnetic direction, as shown in FIG. 2 by the parallel arrows, in the direction of the terrestrial magnetic field. In order that in this position of the disc 1 and the frame 3, respectively, no damaging rotative movement is produced by the suspension spring 4, the disc 1 is at first left unmagnetized when the parts mentioned are assembled and the suspension spring 4, for instance by means of the adjusting device 6, is rotated until the frame 3 reaches a balanced position, which means that the adjusting device is adjusted to the zero mark or the north mark, respectively. After this has been done, the disc 1 in its mounted position is magnetized and will now, if the instrument has not already been orientated to point to the magnetic north, against the tension of the spring 4 perform a rotative movement in the direction of the terrestrial magnetic field. If thereupon the instrument to be orientated is rotated to follow the disc 1 until the latter again points to the zero or north mark, respectively, then the magnetized disc 1 in view of the previously described adjusting steps will not be subjected to any damaging rotative forces of the spring 4 and the instrument is orientated exactly toward north. It is obvious that for the suspension of the rotative system consisting of the disc 1 and the frame 3 a spring 4 be used which consists of a material having a modulus of elasticity which remains substantially constant within the required range of temperature.

When the pivot axis 2 of the disc 1 is arranged horizontally in the magnetic east-west direction, then the circular disc 1 by tilting about the axis 2 is so adjusted that the direction of the magnetization of the disc 1 as indicated by the arrows in FIG. 1 is parallel to the direction of the local terrestrial magnetic field. The disc 1, therefore, adjusts itself absolutely automatically to every local magnetic inclination and permits therefore an orientation of the instrument which is absolutely independent of the geographic latitude without requiring an inconvenient readjustment of the magnetic system.

When the housing 5 is rotated away from its adjusted position, then the spring 4 which is connected with the housing 5 tries to pull the frame 3 along with it. This action will be resisted by the terrestrial magnetic field so that the end effect will be that the frame 3 rotates relative to the housing 5 about an angle which depends upon the strength of the magnetization of the disc 1 and the tension of the spring 4 and this angle is always smaller than the angle between the balanced position and the actual position of the housing. By using the mentioned autocollimator 10 the angle formed between the frame 3 and the housing 5 by the application of a suitable magnification of said autocollimator can be so enlarged as to be equal to the true angle between the balanced position and the actual position of the housing 5 or else be represented at any desired magnification.

FIG. 4 illustrates the magnetic system of the present invention when mounted in a housing which is adapted to be flange-connected to the principal instrument. For the purpose of a clear illustration the cover of the two part housing of the compass has been omitted from this diagrammatic illustration.

The compass housing 5 which has mounted therein the described magnetic system is provided at its lower end with a horizontally extending bore 11 which is used to receive a corresponding cylindrical projection provided on the principal instrument. The lower half of the sleeve portion containing the bore 11 is slotted at 12 and provided with two outwardly extending flange portions 12a. These sleeve and flange portions 12a have a certain elasticity and are united by a clamping bolt 13. After the housing 5 has been mounted with said sleeve portion on the projection 14, the tightening of the bolt 13 assures a secure attachment of the housing 5 to the instrument. The autocollimator is diagrammatically indicated at 10 and points towards the mirror 7 which is mounted on the lower end of the upwardly extending frame 3 which has mounted therein the magnetic disc 1.

In accordance with FIG. 5, the orientation compass of the present invention is mounted on the projection 14 of the housing 15 of a theodolite. The theodolite telescope 16 and the autocollimator 10 are arranged in a position one next to each other and therefore can easily be viewed by the operator of the instrument.

What I claim is:

1. An orientation compass, particularly used as supplement for geodetical instruments, including within a housing a frame, spring means for suspending said frame within said housing for pivotal movement about a vertical axis, and a polar magnetized circular disc mounted within said frame for rotation about a horizontal axis.

2. An orientation compass, particularly used as supplement for geodetical instruments, including within a housing a frame, spring means for suspending said frame within said housing for pivotal movement about a vertical axis, and a polar magnetized circular disc mounted within said frame for rotation about a horizontal axis, said circular disc consisting of magnetic hard material and being magnetized along the direction of a diameter of said disc.

3. An orientation compass, particularly used as supplement for geodetical instruments, including within a housing a frame, spring means for suspending said frame within said housing for pivotal movement about a vertical axis, a polar magnetized circular disc mounted within said frame for rotation about a horizontal axis, and means on said frame for indicating the position of the disc with respect to said housing.

4. An orientation compass, particularly used as supplement for geodetical instruments, including within a housing a frame, spring means for suspending said frame within said housing for pivotal movement about a vertical axis, a polar magnetized circular disc mounted within said frame for rotation about a horizontal axis, and light reflecting means on said frame for indicating the position of said disc with respect to said housing.

5. An orientation compass, particularly used as supplement for geodetical instruments, including within a housing a frame, spring means for suspending said frame within said housing for pivotal movement about a vertical axis, a polar magnetized circular disc mounted within said frame for rotation about a horizontal axis, and mechanical indicating means on said frame for indicating the position of said disc with respect to said housing.

6. An orientation compass, particularly used as supplement for geodetical instruments, including within a housing a frame, spring means for suspending said frame within said housing for pivotal movement about a vertical axis, and a polar magnetized circular disc mounted within said frame for rotation about a horizontal axis, said frame having opposed vertical parallel sides which are arranged close to the plane surfaces of said disc, while the other vertical surfaces of said frame are curved convex and extend into concave recesses in said housing.

7. An orientation compass, particularly used as supplement for geodetical instruments, including within a housing a frame, spring means for suspending said frame within said housing for pivotal movement about a vertical axis, a polar magnetized circular disc mounted within said frame for rotation about a horizontal axis, and means for adjusting the point of attachment of said spring means in said housing.

8. An orientation compass, particularly used as supplement for geodetical instruments, including within a housing a frame, spring means for suspending said frame within said housing for pivotal movement about a vertical axis, a polar magnetized circular disc mounted within said frame for rotation about a horizontal axis, light reflecting means on said frame for indicating the position of said disc with respect to said housing, and an autocollimator with a reticle mounted on said housing for observing the position of said light reflecting means on said frame.

References Cited in the file of this patent

UNITED STATES PATENTS

| 1,533,683 | Abbott | Apr. 14, 1925 |
| 1,986,170 | Wiegand | Jan. 1, 1935 |
| 2,446,258 | Burt | Aug. 3, 1948 |
| 2,772,392 | Mohr | Nov. 27, 1956 |

FOREIGN PATENTS

| 1,709 | Great Britain | May 25, 1886 |
| 169,383 | Switzerland | Aug. 1, 1934 |
| 937,309 | Germany | Jan. 5, 1956 |